Sept. 19, 1933.　　　　P. B. BEKEART　　　　1,927,581

FISHING LINE

Filed June 29, 1932

*Philip Baldwin Bekeart*
INVENTOR.

BY
ATTORNEYS.

Patented Sept. 19, 1933

1,927,581

UNITED STATES PATENT OFFICE 1,927,581

FISHING LINE

Philip Baldwin Bekeart, San Francisco, Calif.

Application June 29, 1932. Serial No. 619,917

2 Claims. (Cl. 117—52)

This invention relates to fishing lines, preferably for use in fly fishing and casting, and has for its primary purpose to provide a line wherein the balance and the weight of the line is proportionately dimensioned at predetermined intervals, by increasing and decreasing the cross sectional area of the line, at certain points throughout the length thereof, so that in casting, the line will leave the reel more readily, longer casts may be made, and the line may be retrieved or returned more readily.

In this specification and the annexed drawing, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

The invention is shown by way of illustrations in the accompanying drawing in which.

Figures 1, 2:
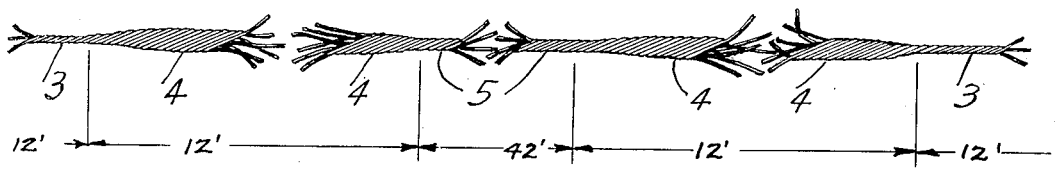
Fig. 1 is a view of my improved fishing line having a triple taper therein.
Fig. 2 is a view of a broken length of my triple taper line to show the actual relation of the different diametered sections.

In my invention I incorporate three thicknesses or tapers into the line, as shown in Fig. 1. The line consists of end sections 3 formed of a predetermined number of strands. In the sections 4, adjacent the end sections, additional strands are included to increase the diameter. The center section 5 is of smaller diameter than, and it is lighter than section 4, but is heavier than end sections 3. The end sections 3 have an approximate length of 12 feet each, the adjacent sections 4 an approximate length of 12 feet, and the center section 5, an approximate length of 42 feet.

The end sections 3 on the line are of one weight and diameter, the adjacent sections 4 of a greater weight and diameter; and the center section 5 is of a weight and diameter intermediate the other sections, or it may be of the same size as the end sections. This arrangement permits the heavy section 4 of the line to act as a weight in casting, and to carry along the free end of the end section 3, and lay it out in front of the balance of the line. The weight of the short length section 4, instead of retarding the cast, helps it along, because of the medium weight of the long center section 5. It will be noted that the line does not carry unnecessary weight in the long length of the center section 5 where it is not needed, but instead carries a heavier weight in the short section 4 where it is needed, to put out the relatively light end section 3 in long, straight, rapid casts.

Having thus described this invention, what I claim and desire to secure by Letters Patent is:

1. A fishing line having the opposite ends of the same length and diameter; sections adjoining the ends of greater diameter than the ends and of approximately the same length; and a center section having a diameter intermediate the diameters of the other sections and a length in excess of each of the other sections.

2. A fishing line consisting of a plurality of strands wound to a uniform diameter; additional strands wound into the line to provide an increased uniform diameter for predetermined sections of the line at points adjoining each of the opposite ends of the line; and strands wound into the line between said last mentioned sections of increased diameter to provide a uniform diameter intermediate the diameter of the ends of the line and the diameter of the sections of the line adjacent the ends.

PHILIP BALDWIN BEKEART.